US008302088B2

(12) United States Patent
Matthiesen

(10) Patent No.: US 8,302,088 B2
(45) Date of Patent: Oct. 30, 2012

(54) ANALYSIS OF EFFECTS OF A SOFTWARE MAINTENANCE PATCH ON CONFIGURATION ITEMS OF A CMDB

(75) Inventor: Brian Robert Matthiesen, Rancho Santa Margarita, CA (US)

(73) Assignee: International Business Machines Corporation, Armonk, NY (US)

( * ) Notice: Subject to any disclaimer, the term of this patent is extended or adjusted under 35 U.S.C. 154(b) by 637 days.

(21) Appl. No.: 12/251,489

(22) Filed: Oct. 15, 2008

(65) Prior Publication Data

US 2010/0095273 A1    Apr. 15, 2010

(51) Int. Cl.
G06F 9/44       (2006.01)
G06F 9/45       (2006.01)
G06F 17/00      (2006.01)
G06F 17/30      (2006.01)
G06G 9/445      (2006.01)

(52) U.S. Cl. ........ 717/168; 717/120; 717/121; 717/173; 717/177; 707/656; 707/804

(58) Field of Classification Search .................. None
See application file for complete search history.

(56) References Cited

U.S. PATENT DOCUMENTS

| | | | | |
|---|---|---|---|---|
| 5,084,813 A * | 1/1992 | Ono | ............................. | 717/107 |
| 6,237,020 B1 * | 5/2001 | Leymann et al. | ............. | 709/201 |
| 6,301,707 B1 * | 10/2001 | Carroll et al. | ................ | 717/177 |
| 6,615,166 B1 * | 9/2003 | Guheen et al. | ................ | 703/27 |
| 6,704,737 B1 * | 3/2004 | Nixon et al. | ................... | 707/656 |
| 7,051,327 B1 * | 5/2006 | Milius et al. | .................. | 717/177 |
| 7,222,349 B1 * | 5/2007 | Krinke et al. | ................ | 719/327 |
| 7,822,785 B2 * | 10/2010 | Ayachitula et al. | ........... | 707/804 |
| 7,831,325 B1 * | 11/2010 | Zhang et al. | .................. | 700/108 |
| 7,913,227 B2 * | 3/2011 | Aikens et al. | ................. | 717/120 |
| 7,926,031 B2 * | 4/2011 | Faihe et al. | .................... | 717/121 |
| 2003/0025732 A1 * | 2/2003 | Prichard | ........................ | 345/765 |

(Continued)

OTHER PUBLICATIONS

H. Madduri et al. "A configuration management database architecture in support of IBM Service Management", [Online], 2007, pp. 441-457, [Retrived from Internet on Jun. 20, 2012], <http://ieeexplore.ieee.org/stamp/stamp.jsp ?tp=&arnumber=5386571>.*

(Continued)

*Primary Examiner* — Thuy Dao
*Assistant Examiner* — Ziaul A Chowdhury
(74) *Attorney, Agent, or Firm* — Yee & Associates, P.C.; Jeffrey S. LaBaw

(57) ABSTRACT

Embodiments of the invention provide a method, a system and a computer program product for analyzing the effect of a software maintenance patch on configuration items of a CMDB. One embodiment, directed to a method, is associated with a CMDB containing information that relates to configuration items (CIs) included in one or more managed configurable systems. The method includes the step of generating a manifest that defines a target system, and contains a description of a maintenance patch disposed to update one or more specified software components. The method further includes using information contained in the manifest to search the CMDB, in order to detect each configurable system in the CMDB that corresponds to the definition of the target system, and contains at least one CI that includes at least one of the specified software components. For a given CI that includes at least one of the specified software components, an identification is made of every other CI in the CMDB that would be affected, if the maintenance patch was used to update each specified software component of the given CI.

20 Claims, 4 Drawing Sheets

U.S. PATENT DOCUMENTS

| | | | |
|---|---|---|---|
| 2003/0046675 A1* | 3/2003 | Cheng et al. | 717/173 |
| 2004/0210653 A1* | 10/2004 | Kanoor et al. | 709/223 |
| 2005/0071838 A1* | 3/2005 | Hatasaki | 717/168 |
| 2005/0097547 A1* | 5/2005 | Ramachandran et al. | 717/177 |
| 2005/0228798 A1* | 10/2005 | Shepard et al. | 707/100 |
| 2005/0278342 A1 | 12/2005 | Abdo et al. | |
| 2006/0004875 A1* | 1/2006 | Baron et al. | 707/200 |
| 2006/0010434 A1* | 1/2006 | Herzog et al. | 717/168 |
| 2006/0117310 A1* | 6/2006 | Daniels et al. | 717/168 |
| 2006/0122937 A1* | 6/2006 | Gatto et al. | 705/51 |
| 2006/0123040 A1* | 6/2006 | McCarthy et al. | 707/102 |
| 2006/0225032 A1 | 10/2006 | Klerk et al. | |
| 2007/0157192 A1* | 7/2007 | Hoefler et al. | 717/168 |
| 2007/0169079 A1* | 7/2007 | Keller et al. | 717/168 |
| 2007/0234331 A1* | 10/2007 | Schow et al. | 717/168 |
| 2007/0239700 A1* | 10/2007 | Ramachandran | 707/5 |
| 2008/0125878 A1* | 5/2008 | Doyle et al. | 700/30 |
| 2008/0183690 A1* | 7/2008 | Ramachandran | 707/5 |
| 2009/0271698 A1* | 10/2009 | Zamurad | 715/234 |
| 2011/0239191 A1* | 9/2011 | Ramachandran | 717/121 |

OTHER PUBLICATIONS

Vincenzo Ambriola et al., "The Evolution of Configuration Management and Version Control" [Online], May 22, 1996, pp. 1-16, [Retrieved from Internet on Jun. 20, 2012], <http://citeseerx.ist.psu.edu/viewdoc/download?doi=10.1.1.36.9203&rep=rep1&type=pdf>.*

C. Word et al., "Integrated change and configuration management",[Online], IBM System Journal, 2007, pp. 459-478, [Retrieved from Internet on Jun. 20, 2012], <http://ieeexplore.ieee.org/stamp/stamp.jsp?tp=&arnumber=5386575>.*

Thoma Kunz et al., "Fast Detection of Communication Patterns in Distributed Executions",[Online], Proceding Cascon 1997, pp. 1-263, [Retrieved from Internet on Jun. 20, 2012] <http://citeseerx.ist.psu.edu/viewdoc/download?doi=10.1.1.86.5228&rep=rep1&type=pdf>.*

* cited by examiner

MDM content: Identity Manager Windows AD Adapter

```
<mdm>
        <identification>
                        <vendor>
                                <vendorName> IBM </vendorName>
                                <vendorID> 00761423 </vendorID>
                        </vendor>
                        <patch>
302                             <patchName> ITIM WinAD Adapter v4.6.15 </patchName>
                                <patchID> TIV-TIM46-FP0015 </patchID>
                                <description>    ITIM WinAD Adapter v4.6.15.
                                                Contains APAR fixes for:
                                                IY00123 Doc error in install procedure
                                                IY00234 Adapter fails on PW restore
                                </description>
                        </patch>
        </identification>
        <prerequisite>
                        <product>
                                <productName> Identity Manager </productName>
                                <partNum> 5724C34AG </partNum>
                                <version> 4.6.0 </version>
                        </product>
304
                        <platform>
                                <os> Windows </os>
                                <osLevel> 2003 </osLevel>
                                <cpu> X86 </cpu>
                        </platform>
        </prerequisite>
        <target>
                        <t1> WinAD Adapter
                                <components>
                                        <c1> adagent.exe </c1>
                                        <c2> agentCfg.exe </c2>
                                        <c3> adProfile.jar </c3>
                                </components>
306                     </t1>
                        <t2> WinAD InfoCenter Documents
                                <components>
                                        <c1> publib.jar </c1>
                                <components>
                        </t2>
        </target>
<mdm>
```

FIG. 3

ANALYSIS OF EFFECTS OF A SOFTWARE MAINTENANCE PATCH ON CONFIGURATION ITEMS OF A CMDB

BACKGROUND OF THE INVENTION

1. Field of the Invention

The invention disclosed and claimed herein generally pertains to a method and system for analyzing effects of a software maintenance patch on respective configuration items in a configurable managed environment, such as a configuration management database (CMDB). More particularly, the invention pertains to a method of the above type wherein a description of the software maintenance patch and the products or other elements that it targets are compared with the contents of the CMDB, in order to identify configuration items contained therein that will be impacted or affected by the maintenance patch.

2. Description of the Related Art

Configuration management is a process for identifying, controlling and tracking the hardware, software and other components of one or more configurable systems in a configurable managed environment, such as an Information Technology organization. Components included in a configurable system are referred to as configuration items (CIs). The configuration management process includes performing tasks, such as identifying CIs and their relationships with other CIs, and adding them to a configuration management database that generally contains detailed information, for each CI listed therein. A CMDB is a database that contains all relevant details for each CI, such as relationships between CIs, state or status and historical information. A related CMDB product of International Business Machines Corporation (IBM) is known as the Configuration and Change Management Database (CCMDB).

A software maintenance patch, as such term is used herein, generally refers to one or more software updates or upgrades for debugging, fixing or enhancing specified software components. Typically, a software maintenance patch includes a set of software updates or fixes, and may also be referred to as a fix pack. Frequently, when a software maintenance patch is applied to the intended software components of a data processing system or the like, relationships between the intended components and other components of the system are not fully understood or appreciated. Accordingly, application of the software maintenance patch can produce results which are not intended or expected, and may also not be desired. The system usefully can be a configurable managed system associated with a CMDB.

When a software maintenance patch is applied to a system, it is quite common for a system administrator to rely on personal experience in gauging or anticipating the likely impact of the patch on components of the system. Alternatively, the administrator may rely on others in his/her organization who are deemed to have relevant experience. System administrators may also rely on release notes, which are commonly supplied by software vendors to describe the content and applicability of the software maintenance deliverables that the vendors provide. However, this type of documentation tends to be unstructured and ambiguous, and often does not provide a sufficient basis for evaluating the necessity and risk of using the associated maintenance patch. The risks may be particularly significant, when performing critical system maintenance activities. Generally, all of the above information sources can be inadequate for use in maintenance evaluation, in view of the complex interrelations among components that are currently found in enterprise information systems infrastructures.

In addition, currently available maintenance installation tools, for use in installing software maintenance patches into CIs of a CMDB, are quite limited at best. For example, a system may contain a number of CIs that are all of the same type, but some of the CIs are products of a different vendor than other CIs. As a result, a tool or program for installing software maintenance patches in the CIs will typically be proprietary to only one of the vendors, and will not work for the CIs of other vendors. At present, there is generally no standard model for maintenance installation tools, for use in applying software maintenance patches and the like, which can be used across the products of different vendors.

BRIEF SUMMARY OF THE INVENTION

Embodiments of the invention provide a method, a system and a computer program product for analyzing the effect of a software maintenance patch on configuration items of a CMDB. One embodiment, directed to a method, is associated with a CMDB containing information that relates to configuration items (CIs) included in one or more managed configurable systems. The method includes the step of generating a manifest that defines a target system, and contains a description of a maintenance patch disposed to update one or more specified software components. The method further includes using information contained in the manifest to search the CMDB, in order to detect each configurable system in the CMDB that corresponds to the definition of the target system, and also contains at least one CI that includes at least one of the specified software components. For a given CI that includes one or more of the specified software components, an identification is made of every other CI in the CMDB that would be affected, if the maintenance patch was used to update each specified software component of the given CI.

BRIEF DESCRIPTION OF THE SEVERAL VIEWS OF THE DRAWINGS

FIG. 3 is a schematic diagram illustrating a Maintenance Delivery Manifest for an embodiment of the invention.

DETAILED DESCRIPTION OF THE INVENTION

Figure 1:
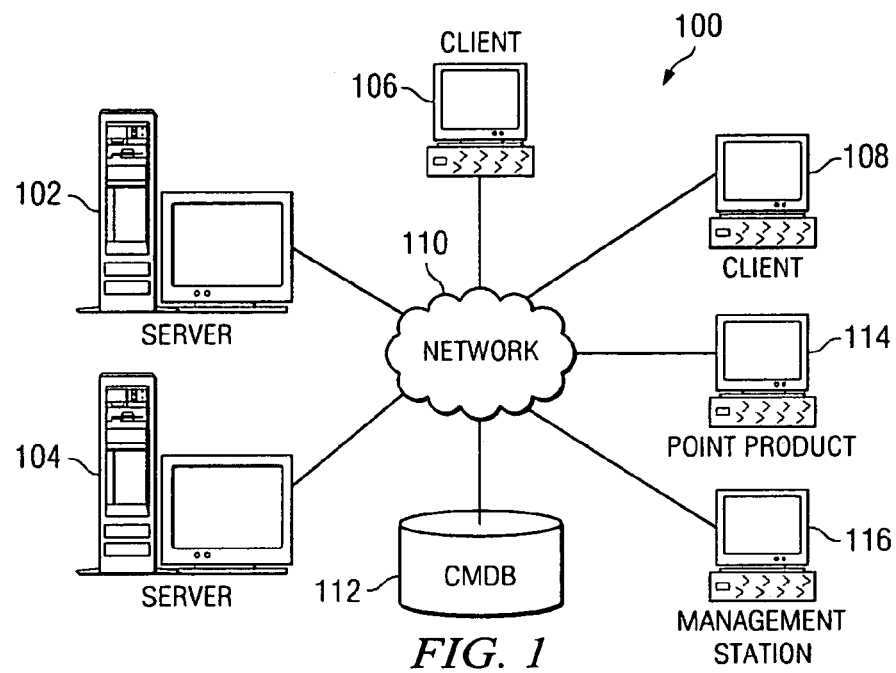
FIG. 1 is a schematic diagram showing a configurable managed system in which an embodiment of the invention may be used.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, there is shown a configurable managed system 100 that includes a number of interrelated configuration items (CIs). Well known types of CIs include desktop computers, servers and computer clients, which are exemplified in FIG. 1 by servers 102 and 104, and by clients 106 and 108. While not shown, the hardware CIs of system 100 may contain operating systems, application programs and other software components that are also CIs. Respective CIs of configurable system 100 can be selectively connected to one another by means of a network 110, which may, for example, comprise the Internet or a LAN.

Referring further to FIG. 1, there is shown system 100 provided with a CMDB 112, with which embodiments of the invention may be used, and further provided with a point product 114. The point product is a component that monitors or provides management services for the as of system 100, and furnishes data concerning respective CIs to CMDB 112. Thus, information pertaining to CIs, wherein the CIs include hardware, software, and monitoring applications, is stored in CMDB 112.

FIG. 1 further shows a computer work station, comprising a management station 116, for use by a Change Manager or other administrator or user associated with configurable managed system 100. Management station 116 is operable to establish and change relationships between respective CIs. Management station 116 is provided with a user interface, as further indicated at FIG. 2, and may be operated by a user to install software maintenance patches, as described above, on software components that comprise or are included in CIs that are associated with CMDB 112. Management station 116 may also be operated to carry out embodiments of the invention, as described herein.

While FIG. 1 shows only a single system 100 associated with CMDB 112, a number of other systems may also include CIs and use CMDB 112 to retain information pertaining to those CIs.

Figure 2:
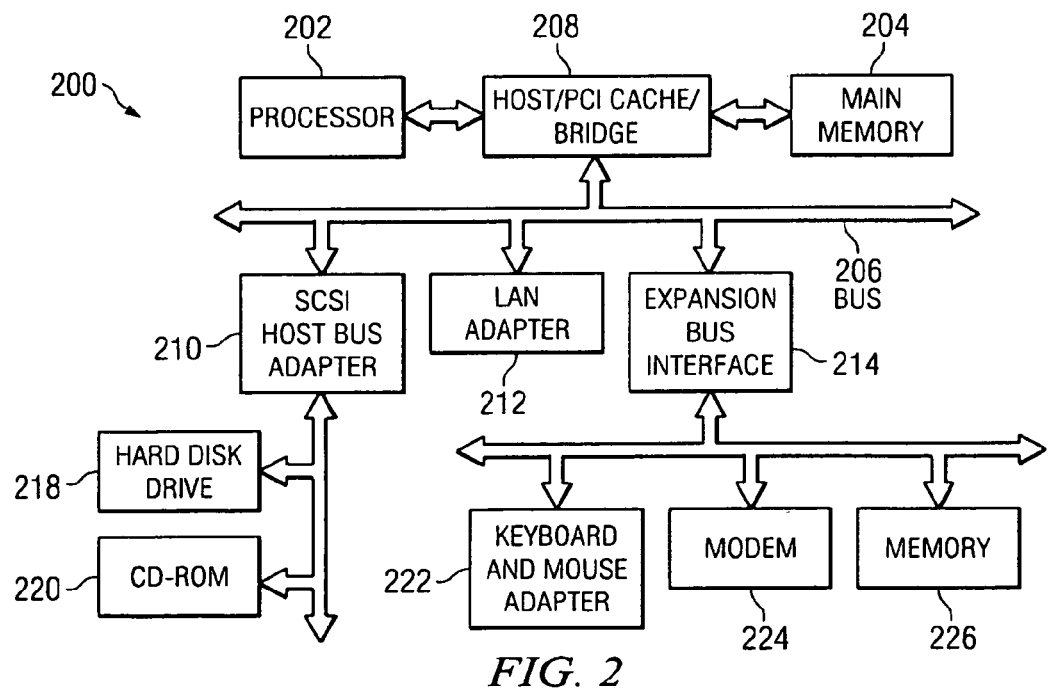
FIG. 2 is a block diagram showing a computer or data processing system for implementing an embodiment of the invention.

Referring to FIG. 2, there is shown a block diagram of a generalized data processing system 200 which may be used to implement management station 116. Data processing system 200 exemplifies a computer, in which code or instructions for implementing the processes of the present invention may be located. Data processing system 200 usefully employs a peripheral component interconnect (PCI) local bus architecture, although other bus architectures may alternatively be used. FIG. 2 shows a processor 202 and main memory 204 connected to a PCI local bus 206 through a Host/PCI bridge 208. PCI bridge 208 also may include an integrated memory controller and cache memory for processor 202.

Referring further to FIG. 2, there is shown a local area network (LAN) adapter 212, a small computer system interface (SCSI), a host bus adapter 210, and an expansion bus interface 214 respectively connected to PCI local bus 206 by direct component connection. SCSI host bus adapter 210 provides a connection for hard disk drive 218, and also for CD-ROM drive 220. Expansion bus interface 214 provides a connection for user interface elements, such as a keyboard and mouse adapter 222, modem 224, and additional memory 226.

An operating system runs on processor 202 and is used to coordinate and provide control of various components within data processing system 200 shown in FIG. 2. The operating system may be a commercially available operating system such as Windows XP, which is available from Microsoft Corporation. Instructions for the operating system and for applications or programs are located on storage devices, such as hard disk drive 220, and may be loaded into main memory 204 for execution by processor 202.

In an embodiment of the invention, users applying a software maintenance patch or fix pack to intended systems or other components generally desire to know what effects, if any, the patch may have beyond the intended components. As a first step in achieving this objective, a document or like entity is generated that describes the content and semantics of the software maintenance patch. This document or other entity is referred to herein as a Maintenance Delivery Manifest (MDM), or simply "manifest", and usefully comprises an Extension Markup Language (XML) based text file, such as the Maintenance Delivery Markup Language (MDML), or other standardized language. The MDM may be constructed by means of a conventional text editor, or possibly by using a specialized tool. In some embodiments of the invention, the MDM is generated or supplied by the vendor of the software patch. In other embodiments, such as where the patch is an application written in-house, the MDM could be prepared by users of the patch.

The MDM describes the intended patch targets, that is, the particular software components or CIs to which the software maintenance patch is directed, in order to update such components or correct defects thereof. These descriptions, comprising a set of target descriptors, is in a language and in terms that will be readily understood by a CMDB, such as CMDB 112, which contains information pertaining to the CIs. For example, the MDM could use language and standards of a type currently used by CMDB's to provide common or standardized object models to represent respective CIs. Usefully, the MDM includes descriptors for the following types of data elements, in a standardized form: Fix pack name and content; Target of the fix pack in terms known to the CMDB; Affected product names and part numbers; Fix pack prerequisites; and Solutions and Authorized Program Application Requests (APAR) contained in the fix pack. Also, a software maintenance patch will be typically targeted to software components that are contained in systems which have certain characteristics. Accordingly, these characteristics can be used as prerequisites to distinguish between systems listed in the CMDB that may contain targeted components, and other systems to which the patch definitely does not apply.

Moreover, for a targeted system component of a particular type, the software maintenance patch could apply to a component of the particular type that was the product of one vendor, but would not apply to the same type of component that was the product of a different vendor. Accordingly, the MDM further includes prerequisites for distinguishing between components or CIs contained in the CMDB that have been supplied by different vendors. These prerequisites can also be used to distinguish between systems and components to which the patch is and is not applicable, respectively.

Another prerequisite included in the MDM is component part number. This prerequisite is readily searchable in the CDMB, in order to locate components to which the patch pertains. It is anticipated that this prerequisite will become increasingly important as a universal part numbering system is developed, wherein each part number will uniquely identify a specific component and will additionally identify the vendor of the component.

Referring to FIG. 3, there is shown an MDM as described above comprising principal sections 302-306. As an illustrative example, the MDM refers to a patch comprising an Identity Manager Windows AD Adapter. Section 302 provides an identification and description of the software maintenance patch, and includes the patch name, the patch identification number and the name of the patch vendor. This section further describes the particular APAR fixes that the patch provides.

Section 304 of the MDM indicates the prerequisites, as described above, for the systems or other products on which components or CIs targeted by the software maintenance patch may be found. Section 304 provides the name or names of such products, and also provides their respective part numbers. The platform on which respective products are run is also provided. This section may additionally include the vendor names of respective products.

Section 306 identifies the target CIs of respective systems, that is, the CIs which are to be updated or corrected by the software maintenance patch. FIG. 3 shows that the targeted CIs include both a target t1 and a target t2. Target section 306 further indicates that one or more specified software components such as <C1>-<C3> are included with each target.

It is to be emphasized that the MDM, as illustrated by FIG. 3, provides a rigorous description of both the software maintenance patch and the target CIs to which the patch applies. This description facilitates the search of the CMDB, to identify and locate targeted CIs that are contained therein. The description also facilitates an impact analysis, to determine the effects on other CIs resulting from application of the maintenance patch to the targeted CIs.

Figure 4:
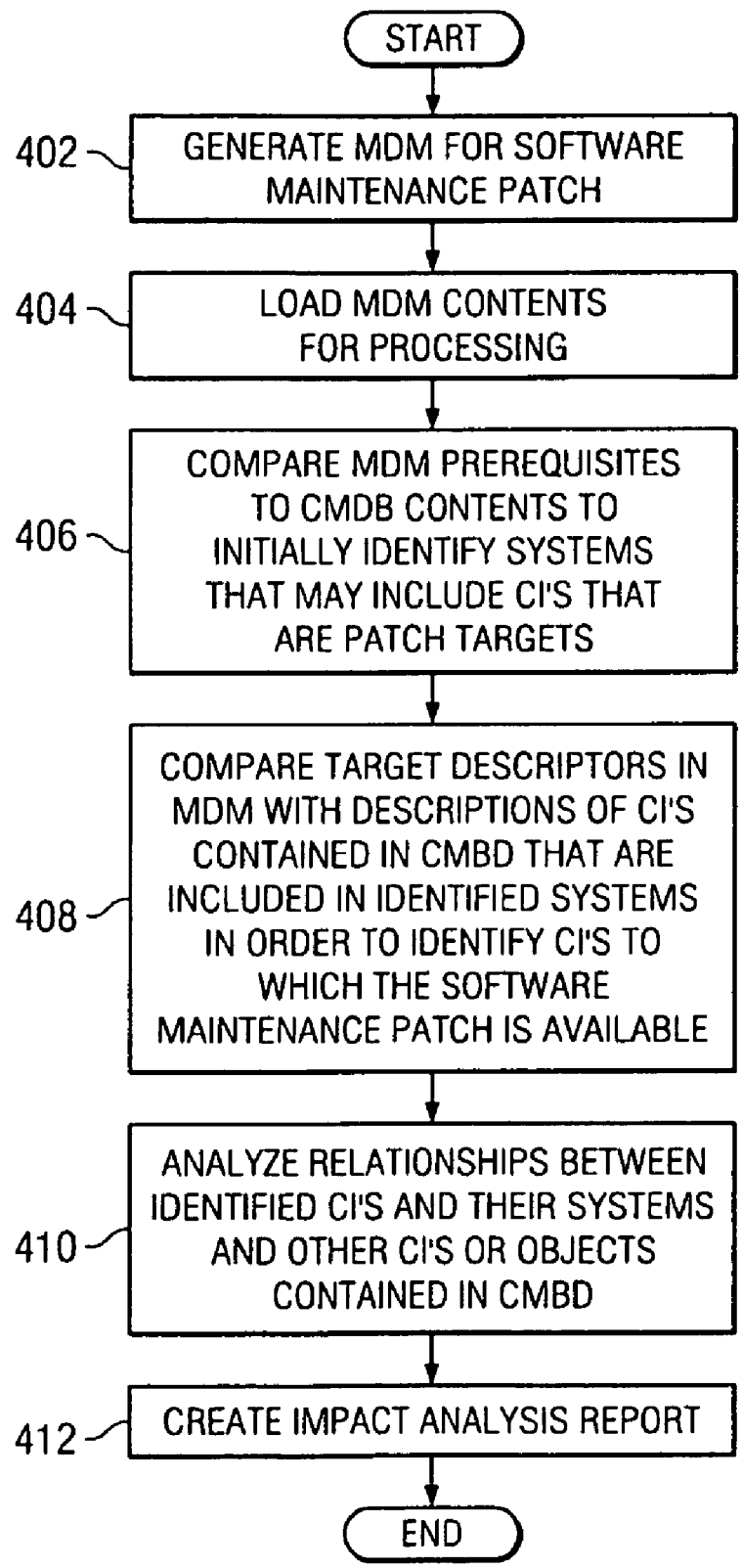
FIG. 4 is a flow chart showing selected steps for a method comprising an embodiment of the invention.

Referring to FIG. 4, there are shown selected steps of a method comprising an embodiment of the invention. At step 402, a user generates or creates an MDM as described above. At step 404 the contents of the MDM are loaded for processing, such as by operation of management station 116. That is, the MDM is bound to or combined with the contents of the CMDB. At step 406, the MDM prerequisites are compared with the CMDB contents, in order to initially identify or locate those systems listed in the CMDB that may include CIs intended to be targets of the software maintenance patch. Prerequisite information contained in the MDM could be searched in the CMDB, in order to locate such systems.

As described above, the MDM contains target descriptors in textual form. At step 408, target descriptors of the MDM are compared with textual descriptions in the CMDB of CIs contained therein, that are included in each of the systems identified at step 406. Usefully, some or all of these descriptions may comprise standards-based vendor-independent descriptions or identifiers. This comparison identifies target CIs in such systems, that is, CIs or software components of the CIs to which the software maintenance patch is applicable.

At step 410, an analysis is carried out, in regard to a particular identified CI, in order to identify other CIs or objects contained in the CMDB that would be affected or impacted if the software maintenance patch was used to update a software component of the particular CI. Such analysis could be carried out, for example, by means of a CMBD that comprises the CCMDB product of IBM, referred to above. Following this analysis, the CCMDB may also be operated to create a report, as shown by step 412, that indicates the impact on other CIs or objects of applying the maintenance patch to the particular CI. Such report would usefully identify each affected CI, and would also describe the anticipated effect thereon, as the result of applying the patch to the particular CI.

FIG. 4 shows the method thereof coming to an end following step 412. As an option, however, step 412 could be followed by an additional step that updated the CMDB to reflect the new maintenance level of each identified target system.

In one embodiment, a plug-in module could be used with management station 116 to implement one or more steps of the above method.

Figure 5:
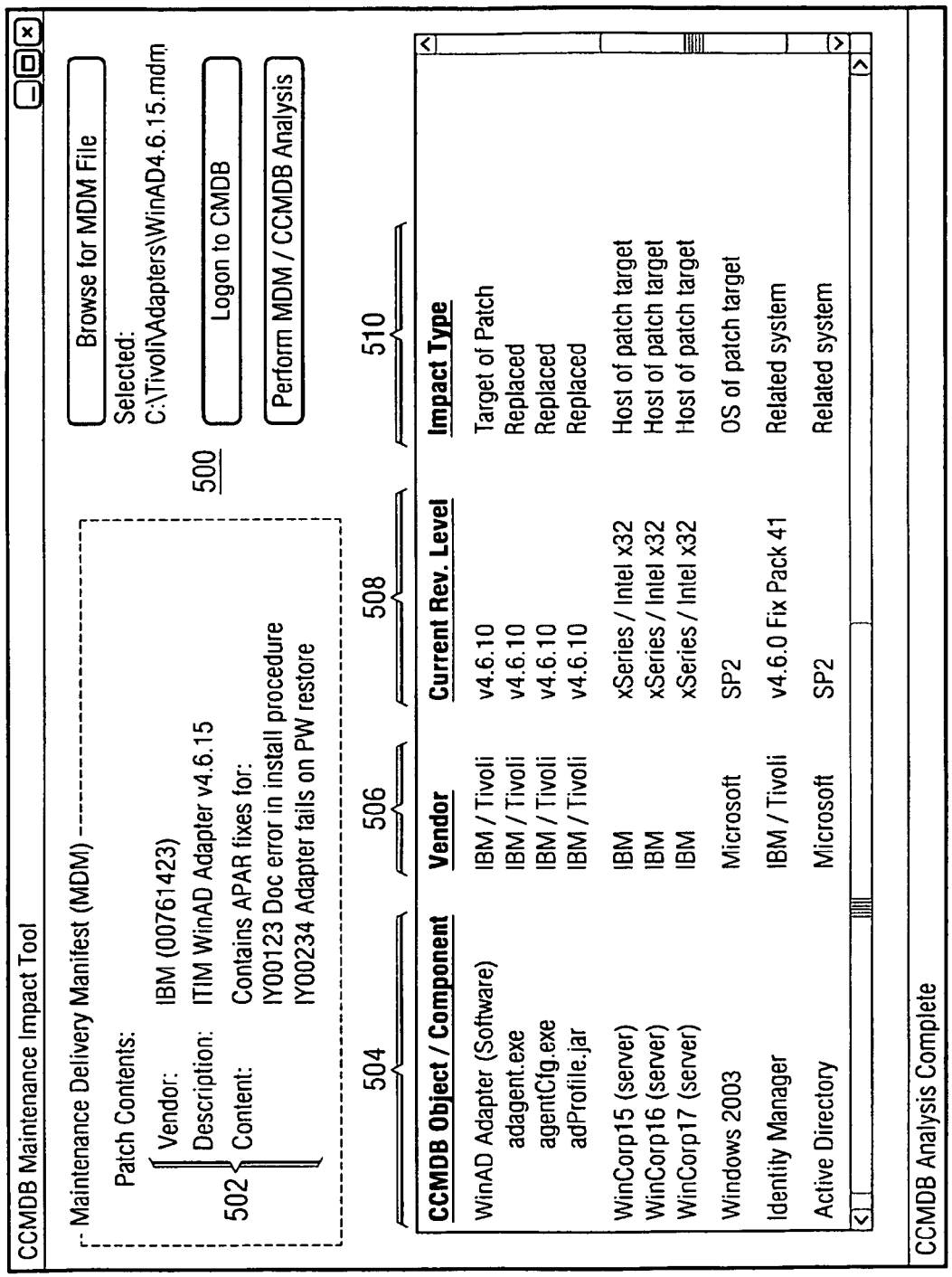
FIG. 5 is a schematic diagram depicting the screen of a User Interface that shows an example of results provided by an embodiment of the invention.

Referring to FIG. 5, there is shown the screen 500 of a User Interface or the like, that displays an example of results provided by an embodiment of the invention. The embodiment uses the CCMDB product referred to above to function as the CMDB. Patch contents are displayed as item 502, and a column 504 contains CMDB objects or components. For each item in column 504, the corresponding vendor, current revision level and types of impact of the patch are displayed at columns 506, 508 and 510, respectively.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In association with a configuration management database (CMDB) containing information that relates to configuration items (CIs) included in one or more managed configurable systems, a computer implemented method comprising the steps of:

generating a manifest that defines a target system, and contains a description of a software maintenance patch disposed to update one or more specified software components of the target system;

using information contained in the manifest to search the CMDB, in order to detect each configurable system in the CMDB that corresponds to said target system, and contains at least one CI that includes at least one of said specified software components;
said manifest includes a set of descriptors that respectively describe elements of said target system, and said descriptors comprise one or more system prerequisites, wherein said prerequisites are used to search said CMDB to identify a first system, that includes one of said specified software components, and
for a given CI that includes at least one of said specified software components, identifying every other CI in the CMDB that would be affected by the software maintenance patch if the software maintenance patch was used to update each specified software component of the given CI.

2. The method of claim 1, wherein:
said method includes generating an impact analysis report that discloses each of said identified CIs, and further discloses an anticipated effect on each identified CI if the maintenance patch is used to update respective specified software components of said CMDB.

3. The method of claim 1, wherein:
said manifest comprises a document that describes the content and semantics of the software maintenance patch, said descriptors include one or more Authorized Program Application Requests (APARs), and said CMDB is searched by comparing each of said descriptors with descriptions of respective elements of said configurable systems, said element descriptions being respectively contained in the CMDB, and at least some of the descriptions comprising standards-based vendor-independent descriptions or identifiers, selectively.

4. The method of claim 3, wherein:
CIs in said CMDB contain at least one product of a particular type that may be supplied by any of two or more different vendors, and said manifest includes descriptors that uniquely identify each CI that contains said product of said particular type which has been supplied by a particular one of said vendors.

5. The method of claim 4, wherein:
said product of said particular type supplied by one of said vendors is uniquely identified and distinguished from said product of said particular type supplied by other of said vendors by a part number that is included in a part numbering system common to all of said vendors.

6. The method of claim 1, wherein:
said manifest includes prerequisites for use in distinguishing between CIs to which said software maintenance patch is and is not applicable, respectively.

7. The method of claim 1, wherein:
said manifest includes a description of the contents of said software maintenance patch.

8. The method of claim 1, wherein:
said manifest specifies the respective specified software components which will be affected by said software maintenance patch, and further indicates the effects of said software maintenance patch on the respective components.

9. The method of claim 8, wherein:
the effects of said software maintenance patch include at least updating a respective component, and correcting defects thereof, selectively.

10. The method of claim 1, wherein:
a plug-in module is used to implement one or more steps of said method.

11. In association with a configuration management database (CMDB) containing information that relates to configuration items (CIs) included in one or more managed configurable systems, a computer program product stored in a non-transitory computer readable medium comprising:
instructions for generating a manifest that defines a target system, and contains a description of a software maintenance patch disposed to update one or more specified software components of the target system;
instructions for using information contained in the manifest to search the CMDB, in order to detect each configurable system in the CMDB that corresponds to of said target system, and contains at least one CI that includes at least one of said specified software components;
said manifest includes a set of descriptors that respectively describe elements of said target system, and said descriptors comprise one or more system prerequisites, wherein said prerequisites are used to search said CMDB to identify a first system, that includes one of said specified software components, and
for a given CI that includes at least one of said specified software components, instructions for identifying every other CI in the CMDB that would be affected the software maintenance patch if the software maintenance patch was used to update each specified software component of the given CI.

12. The computer program product of claim 11, wherein:
said method includes generating an impact analysis report that discloses each of said identified CIs, and further discloses an anticipated effect on each identified CI if the maintenance patch is used to update respective specified software components of said CMDB.

13. The computer program product of claim 11, wherein:
said manifest comprises a set of descriptors that respectively describe elements of said target system, said descriptors including one or more system prerequisites, wherein said prerequisites are used to search said CMDB to identify a first system that includes one of said specified software components, and said CMDB is searched by comparing each of said descriptors with descriptions of respective elements of said configurable systems, said element descriptions being respectively contained in the CMDB.

14. The computer program product of claim 11, wherein:
said manifest includes prerequisites for use in distinguishing between CIs to which said software maintenance patch is and is not applicable, respectively, and said manifest includes a description of the contents of said software maintenance patch.

15. The computer program product of claim 11, wherein:
said manifest comprises an XML-based text file.

16. In association with a configuration management database (CMDB) containing information that relates to configuration items (CIs) included in one or more managed configurable systems, a computer apparatus comprising a non-transitory computer readable medium, and further comprising:
a component for generating a manifest that defines a target system, and contains a description of a software maintenance patch disposed to update one or more specified software components of the target system;
a component for using information contained in the manifest to search the CMDB, in order to detect each configurable system in the CMDB that corresponds to of said target system, and contains at least one CI that includes at least one of said specified software components;
said manifest includes a set of descriptors that respectively describe elements of said target system, and said descriptors comprise one or more system prerequisites, wherein said prerequisites are used to search said CMDB to identify a first system, that includes one of said specified software components, and for a given CI that includes at least one of said specified software components, a component for identifying every other CI in the CMDB that would be affected by the software maintenance patch if the software maintenance patch was used to update each specified software component of the given CI.

17. The apparatus of claim 16, wherein:

said apparatus includes a component for generating an impact analysis report that discloses each of said identified CIs, and further discloses an anticipated effect on each identified CI if the maintenance patch is used to update respective specified software components of said CMDB.

18. The apparatus of claim 16, wherein:

said manifest comprises a set of descriptors that respectively describe elements of said target system, said descriptors including one or more system prerequisites, wherein said prerequisites are used to search said CMDB to identify a first system that includes one of said specified software components, and said CMDB is searched by comparing each of said descriptors with descriptions of respective elements of said configurable systems, said elements descriptions being respectively contained in the CMDB.

19. The apparatus of claim 16, wherein:

said manifest includes prerequisites for use in distinguishing between CIs to which said software maintenance patch is and is not applicable, respectively, and said manifest includes a description of the contents of said software maintenance patch.

20. The apparatus of claim 16, wherein:

said manifest comprises an XML-based text file.

\* \* \* \* \*